United States Patent
Fang et al.

(10) Patent No.: US 8,160,126 B2
(45) Date of Patent: Apr. 17, 2012

(54) METHOD, DEVICE AND SYSTEM FOR UPSTREAM POWER BACK-OFF IN DIGITAL SUBSCRIBER LINE

(75) Inventors: Liming Fang, Shenzhen (CN); Jianping Tu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/096,650

(22) Filed: Apr. 28, 2011

(65) Prior Publication Data

US 2011/0200087 A1 Aug. 18, 2011

Related U.S. Application Data

(63) Continuation of application No. PCT/CN2009/074717, filed on Oct. 30, 2009.

(30) Foreign Application Priority Data

Oct. 31, 2008 (CN) .......................... 2008 1 0218828

(51) Int. Cl.
  *H04B 1/38* (2006.01)
  *H04L 27/04* (2006.01)
  *H04L 12/26* (2006.01)

(52) U.S. Cl. ........ 375/220; 375/224; 375/295; 370/252; 379/1.04; 379/400; 379/413

(58) Field of Classification Search ............. 375/220, 375/222, 224, 295, 296, 346; 370/241, 247, 370/248, 252; 379/1.01, 1.03, 1.04, 399.01, 379/400, 413, 414, 417
See application file for complete search history.

(56) References Cited

U.S. PATENT DOCUMENTS

| | | | |
|---|---|---|---|
| 6,922,448 B1 * | 7/2005 | Jacobsen et al. | 375/295 |
| 7,460,588 B2 * | 12/2008 | Rhee et al. | 375/222 |
| 7,558,315 B2 * | 7/2009 | Cioffi et al. | 375/222 |
| 7,924,736 B2 * | 4/2011 | Cioffi et al. | 370/252 |
| 2005/0123028 A1 * | 6/2005 | Cioffi et al. | 375/222 |
| 2008/0205501 A1 * | 8/2008 | Cioffi et al. | 375/224 |
| 2009/0323903 A1 * | 12/2009 | Cioffi et al. | 379/32.01 |
| 2011/0188640 A1 * | 8/2011 | Cioffi et al. | 379/27.01 |

* cited by examiner

*Primary Examiner* — Binh Tieu
(74) *Attorney, Agent, or Firm* — Brinks Hofer Gilson & Lione

(57) ABSTRACT

A method, a device and a system for Upstream Power Back-Off (UPBO) in a Digital Subscriber Line (DSL) are provided. The method includes: collecting subscriber line information (S50); determining a reference line length according to the subscriber line information (S52); obtaining UPBO parameters of each upstream band of each subscriber line according to the determined reference line length (S54), where the UPBO parameters include an original point parameter, a back-off slope parameter, and a maximal close frequency point (UPBOFMAX) corresponding to the band; and executing an UPBO process on the band of the corresponding subscriber line below the UPBOFMAX according to the UPBO parameters (S58). Thus, the stability of longer lines can be ensured, an upstream rate of short lines is maximally increased, and the existing UPBO mode is fully compatible.

15 Claims, 3 Drawing Sheets

METHOD, DEVICE AND SYSTEM FOR UPSTREAM POWER BACK-OFF IN DIGITAL SUBSCRIBER LINE

CROSS-REFERENCE TO RELATED APPLICATIONS

This application is a continuation of International Application No. PCT/CN2009/074717, filed on Oct. 30, 2009, which claims priority to Chinese Patent Application No. 200810218828.9, filed on Oct. 31, 2008, both of which are hereby incorporated by reference in their entireties.

FIELD OF THE INVENTION

The present invention relates to the field of digital communications, and in particular, to a method, a device and a system for Upstream Power Back-Off (UPBO) in a Digital Subscriber Line (DSL).

BACKGROUND OF THE INVENTION

The DSL technology is a high-speed transmission technology, where data is transmitted through a telephone twist pair cable, that is, an Unshielded Twist Pair (UTP) cable, and the DSL includes an Asymmetrical Digital Subscriber Line (ADSL), a Very-high-bit-rate Digital Subscriber Line (VDSL), an Integrated Services Digital Network (ISDN) Digital Subscriber Line (IDSL), and a Single-pair High-bit-rate Digital Subscriber Line (SHDSL), which are collectively called xDSL in the following.

In the X Digital Subscriber Line (xDSL) technologies, besides the DSLs being the IDSL and SHDSL, where transmission is performed through a baseband, the DSL using a passband for transmission uses a frequency division multiplexing technology, so that the DSL and a Plain Old Telephone Service (POTS) coexist on the same pair of the twist pair cables, where the DSL occupies a high band, the POTS occupies a baseband part lower than 4 KHz, and a POTS signal and a DSL signal is split or integrated through a splitter. The xDSL using the passband for transmission uses a Discrete Multi-Tone Modulation (DMT) technology to perform modulation and demodulation. A system providing multi-path DSL access is called a DSL Access Multiplexer (DSLAM), and a schematic view of system connection relations of the DSLAM is as shown in FIG. 1. A subscriber end DSLAM 120 includes a subscriber end transceiver unit 121 and a subscriber end splitter 122. In an upstream direction, the subscriber end transceiver unit 121 receives a DSL signal from a computer 110, amplifies the received DSL signal, and sends the amplified DSL signal to the subscriber end splitter 122. The subscriber end splitter 122 integrates the DSL signal from the subscriber end transceiver unit 121 and a POTS signal from a telephone terminal 130. The integrated signal is transmitted through a multi-path UTP 140, and is received by a central office end splitter 151 of a peer end DSLAM 150. The central office end splitter 151 splits the received signal, sends the POTS signal in the received signal to a Public Switched Telephone Network (PSTN) 160, and sends the DSL signal in the received signal to a central office end transceiver unit 152 of the DSLAM 150. The central office end transceiver unit 152 amplifies the received signal, and sends the amplified signal to a Network Management System (NMS) 170. In a signal downstream direction, a signal is transmitted in an order reverse to the above order.

A subscriber cable generally includes multiple (25 or more) pairs of twist pair cables. Various services may be run in each twist pair cable. When different kinds of xDSLs are run at the same time, crosstalk is incurred among the different kinds of xDSLs, and performance of some subscriber lines may drop sharply due to the crosstalk. If the subscriber lines are long, no DSL service of any kind can be run in some subscriber lines due to the crosstalk. The crosstalk is a major factor affecting a subscriber rate in a VDSL system. Especially for long and short lines, as shown in FIG. 2, upstream far-end crosstalk (FEXT) from a short line to a long line is very serious, after a short line is activated, performance of an already activated long line drops sharply, and the long line may even be dropped.

UPBO is configured to reduce the upstream FEXT from a short line to a long line in the same bundle of lines. That is to say, through appropriate configuration, upstream Power Spectral Density (PSD) of short lines is appropriately decreased, so as to reduce the crosstalk to long lines in the same bundle, so as to enhance stability of the operation of the subscriber lines.

In Chapter 7.2.1.3 of International Telecommunication Union-Telecommunication (ITU-T) Recommendation G993.2, an existing UPBO method is proposed.

In the existing UPBO method, a set of formulas and a reference point determined by an operator are defined, each subscriber line automatically calculates an UPBO PSD mask of each subscriber line itself. That is to say, each subscriber line calculates the upstream PSD of each subscriber line itself according to the subscriber line length, which is represented by the length of a circuit. In particular, a formula used by each subscriber line to calculate the UPBMASK is as follows.

$$K(kl_0,f) = \text{UPBOPSD}(f) + \text{LOSS}(kl_0,f) + 3.5 \text{ [dBm/Hz]}, \quad (1)$$

where, $\text{LOSS}(kl_0, f) = kl_0\sqrt{f}$ [dB]

$\text{UPBOPSD}(f) = -a - b\sqrt{f}$ [dBm/Hz],

UPBOMASK (kl0, f) represents the UPBOMASK of the line segment on a band f; LOSS ($kl_0$, f) is an attenuation value; $kl_0$ is circuit length of the line segment; a and b are UPBO parameters, a is used for representing original point information of the back-off of the band, which is uniformly called parameter a or an original point parameter hereafter; b is used for representing back-off slope information of the subscriber line on the band, which is uniformly called parameter b or a back-off slop parameter hereafter.

In the method, reference line length $kl_{0\text{-}ref}$ is selected firstly according to subscriber line scenario experience, a parameter a(i) and a parameter b(i) of each pair of lines on each band are then calculated according to the reference line length, a Customer Premise Equipment (CPE) modem calculates the UPBOMASK of the back-off of whole upstream band according to formula (1), and the UPBOMASK is intersected with a pre-defined standard PSDMASK. That is to say, power back-off is performed on all bands of subscriber lines in a bundle of lines shorter than the reference line length according to a and b configured by a template.

When the values of the parameter a(i) and the parameter b(i) of each pair of lines on each band are calculated according to the selected reference line length, the calculation is performed by reasonable deduction with the standard PSDMASK value, the reference line length, and the above formula. More details may be obtained from ITU-T Recommendation G.993.2 and other documents, and are not described herein.

During the implementation of the present invention, the inventors find that the existing UPBO method has the following defects.

If the selected reference line is too short, many lines are not covered by the performing of the UPBO, the FEXT from a close line shorter than the reference line to a farther line is still very strong, so that the performing of the UPBO does not achieve an obvious effect. If the selected reference line is too long, the UPBO is performed on all of the lines, the FEXT among lines is not strong, but since power of a high frequency part of a short line is lowered enormously, a great loss is incurred to an upstream rate of the short line.

In Amendment 2 of ITU-T Recommendation G.993.2, an equalized UPBO method, that is equalized FEXT UPBO, is proposed. Since in the described existing UPBO method, the impact of the FEXT from short lines is over estimated, which results in too much back-off of spectrum of the short lines, a parameter of reference line electrical length kl0-ref is introduced in this method, and the UPBO is performed by adopting the following formula.

$$UPBOMASK(f) = \qquad (2)$$
$$-a - b\sqrt{f} + 10\log_{10}\left(\frac{kl_{0\_REF}}{kl_0}\right) + LOSS(kl_0, f) + 3.5 \quad [dBm/Hz],$$

In the formula, $0 < kl_0 < kl_{0\_REF}$. In the method, compensation is performed on the short lines to some extent.

During the implementation of the present invention, the inventors find that the method also has the following defects. In the technical solution, an FEXT compensation item is added to prevent the PSD of short lines from being lowered too much. But on all bands, a value used for compensation is constant, the back-off is still performed on the short lines on the high band which is not used by the long lines, so that losses incurred to the short lines on the high frequency are still heavy.

In view of the above, in the two existing UPBO methods, since back-off is performed on the whole band according to the parameter a and the parameter b, the upstream rate of the short lines is decreased sharply, and performance of the short lines is harmed seriously. Specifically, since the back-off increases along with the rising of the frequency, the back-off is also performed on the short lines on the high band not used by the long lines. Although the short line may incur crosstalk to the long line on the high frequency part, the long line does not bear bit on the high band, that is to say, the back-off performed on the short line on the high frequency part does not improve the performance of the long line, but the performance of the short line makes sacrifices instead. Especially in current years, due to demands of high-speed services, such as Voice over Internet Protocol (VOIP), Internet Protocol television (IPTV), and High-definition television (HDTV), the trend of the convergence of three networks, becomes increasingly obvious, and the requirements on the bandwidth are increasingly higher.

SUMMARY OF THE INVENTION

Embodiments of the present invention provide a method, a device and a system for UPBO in a DSL, so as to prevent a bandwidth from being too large when an UPBO process is performed on short lines, thereby maximizing an UPBO gain.

According to the technical solutions of the present invention, an embodiment of the present invention provides an UPBO method in a DSL, where the method includes:

collecting subscriber line information, where the subscriber line information includes configuration information and at least one of subscriber line operating information and topology information, the subscriber line operating information includes subscriber line attenuation Hlog information, the topology information includes a subscriber line length, and the configuration information includes template Profile information and bandplan information;

determining a reference line length according to the subscriber line information; and obtaining UPBO parameters of each upstream band of each subscriber line according to the reference line length, so that CPE executes an UPBO process on the band of the corresponding subscriber line below a maximal close frequency point according to the UPBO parameters including an original point parameter, a back-off slope parameter, and the maximal close frequency point UPBOFMAX corresponding to the band.

Accordingly, an embodiment of the present invention provides a device for obtaining UPBO parameters, where the device includes:

a subscriber line information collecting module, configured to collect subscriber line information, where the subscriber line information includes configuration information and at least one of subscriber line operating information and topology information, the subscriber line operating information includes subscriber line attenuation Hlog information, the topology information includes a subscriber line length, and the configuration information includes template Profile information and bandplan information;

a reference line length selecting module, configured to determine a reference line length according to the subscriber line information collected by the subscriber line information collecting module; and a parameter control module, configured to obtain UPBO parameters of each upstream band of each subscriber line according to the reference line length, where the UPBO parameters includes a parameter a, a parameter b, and a maximal close frequency point UPBOFMAX.

Accordingly, an embodiment of the present invention provides a device for executing UPBO parameters, where the device includes:

a parameter receiving module, configured to receive the UPBO parameters, which include an original point parameter, a back-off slope parameter, and a maximal close frequency point UPBOFMAX of each upstream band of each subscriber line; and an UPBO executing unit, configured to execute an UPBO process on the corresponding band of the subscriber line below the maximal close frequency point according to the UPBO parameters received by the parameter receiving module.

Accordingly, an embodiment of the present invention provides an UPBO system in a DSL, where the system includes:

central office end equipment, configured to collect subscriber line information; determine a reference line length according to the subscriber line information by a subscriber line information collecting module; and obtain UPBO parameters of each upstream band of each subscriber line according to the reference line length, where the subscriber line information includes configuration information and at least one of subscriber line operating information and topology information, the subscriber line operating information includes subscriber line attenuation Hlog information, the topology information in eludes a subscriber line length, and the configuration information includes template Profile information and bandplan information, and the UPBO parameters include an original point parameter, a back-off slope parameter, and a maximal close frequency point UPBOFMAX; and a customer premise equipment (CPE), configured to receive the UPBO parameters, which include the original point parameter, the back-off slope parameter, and the maximal close frequency point UPBOFMAX of each of the upstream bands of each of the subscriber lines; and execute an UPBO process on the corresponding band of the subscriber line below the maximal close frequency point according to the UPBO parameters received by a parameter receiving module.

Beneficial effects of the embodiments of the present invention are as follows.

In the embodiments of the present invention, an UPBOFMAX parameter is introduced to UPBO parameters, while the stability of subscriber lines is ensured, the UPBOFMAX parameter used for executing UPBO on short lines is controlled to prevent a bandwidth from being too large when an UPBO process is performed on the short lines. High frequency parts of the short lines are used to bearing more bits, thereby maximally increasing an upstream rate of the short lines, so as to maximize an UPBO gain, and increase potential demands of an operator on the upstream high rate.

In addition, in the embodiments of the present invention, an optimal reference line length can be obtained automatically, and the existing UPBO mode is also fully compatible.

DETAILED DESCRIPTION OF THE EMBODIMENTS

In order make persons skilled in the art understand the technical solutions in embodiments of the present invention more clearly, a method, a device and a system for UPBO in a DSL according to the embodiments of the present invention are described below in detail with reference to the accompanying drawings.

Figure 1:
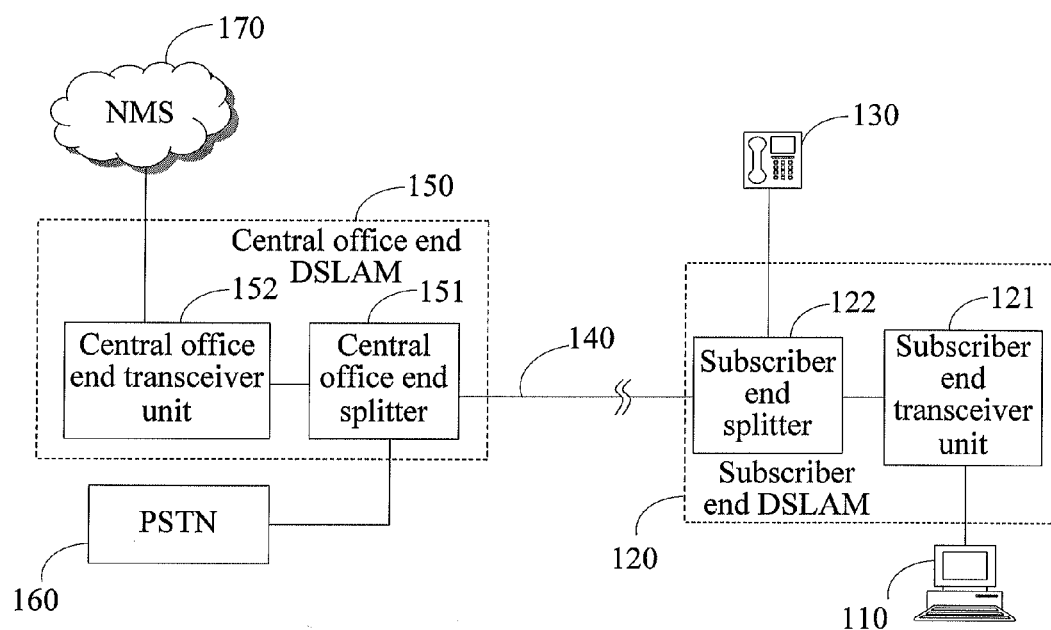
FIG. 1 is a schematic view of an xDSL system reference model in the prior art.
Figure 2:
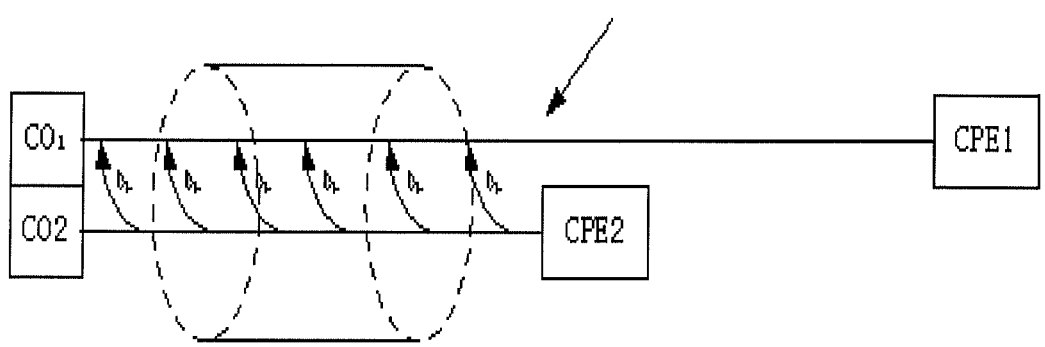
FIG. 2 is a schematic view of upstream FEXT among subscriber lines of different lengths in the prior art.
Figure 3:
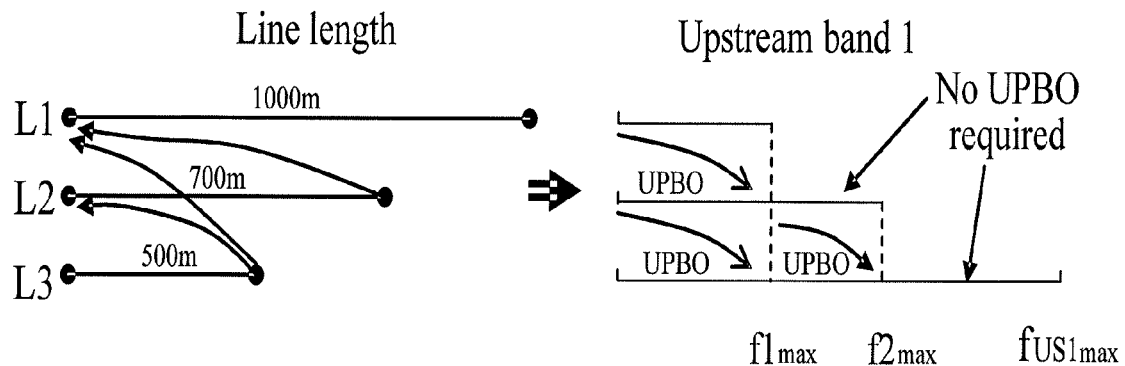
FIG. 3 is a schematic principle view of an embodiment of the present invention.

FIG. 3 is a schematic principle view of an embodiment of the present invention. Referring to FIG. 3, since a long line often does not uses some high bands of a short line, in the embodiment of the present invention, the UPBO is only to be performed on the bands of the short line on which serious FEXT is incurred to the long line, and the UPBO processing is not performed on the high bands not used by the long line. In FIG. 3, the UPBO processing is not performed on a right band of a subscriber line L2 and a subscriber line L3.

Therefore, the main idea of the embodiment of the present invention is: selecting an appropriate reference line length, calculating a parameter a and a parameter b of each upstream band of each pair of lines, finding a maximal tone used on each band of a long subscriber line, using a frequency point corresponding to the tone as a maximal close frequency point UPBOMAX when the UPBO is performed on a short line; and determining UPBOMASK of each band according to the parameter a, parameter b, and the UPBOMAX. Therefore, no back-off is required to be performed on the high band part (the band above the frequency point UPBOMAX) of the short line on which the long line is not affected, and the rate of the loss of the short line is minimal.

Figure 4:
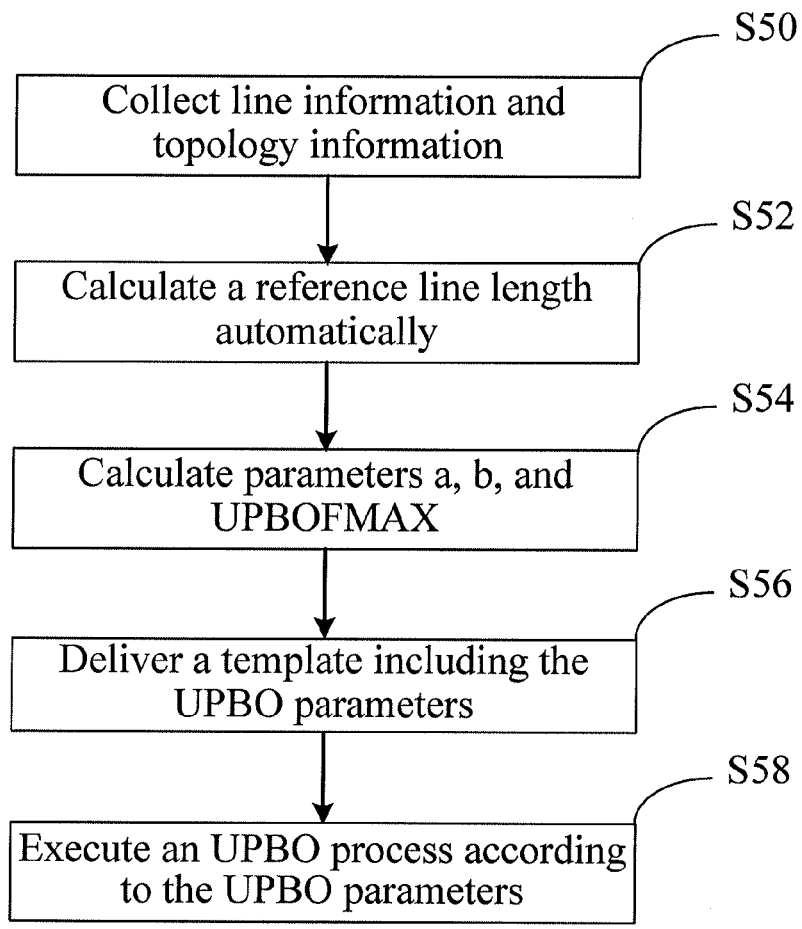
FIG. 4 is a schematic view of an UPBO method in a DSL according to an embodiment of the present invention.

FIG. 4 is a schematic view of an embodiment of an UPBO method in a DSL according to the present invention. Referring to FIG. 4, the DSL UPBO method includes the following steps.

In step S50, subscriber line information is collected.

The subscriber line information may include configuration information and at least one of subscriber line operating information and topology information. The subscriber line operating information includes subscriber line attenuation Hlog information. The topology information includes a subscriber line length. The configuration information includes template Profile information and bandplan information. Besides the subscriber line attenuation information Hlog, the subscriber line operating information may further include Quiet Line Noise (QLN) information and bit allocation table b table information. Besides the subscriber line length, the topology information may further include distribution of the subscriber line. In actual applications, during the collecting process, an NMS or a DSLAM sends a request to central office end equipment CO, and the central office end equipment performs reporting, thereby completing the collecting process.

In step S52, a reference line length is determined according to the collected subscriber line information.

The reference line length is determined automatically, for example, by calculation.

In step S54, UPBO parameters of each upstream band of each subscriber line are obtained according to the determined reference line length.

The UPBO parameters include a parameter a corresponding to the band, that is an original point parameter, a parameter b, that is a back-off slope parameter, and a maximal close frequency point UPBOFMAX.

In step S56, a template including the UPBO parameters of each upstream band each group of or each of the subscriber lines is generated for each group of or each of the subscriber lines, and the template is delivered to an UPBO executing device for being executed.

The UPBO executing device may be a CPE.

In step S58, the UPBO executing device executes an UPBO process on the band of the corresponding subscriber line below the maximal close frequency point according to the received UPBO parameters.

In different examples, the determining of the reference line length in step S52, the obtaining the UPBO parameters of each of the upstream bands in step S54, and the execution of the UPBO process in step S58 may all be implemented with different processes or in different manners. For the sake of better understanding, four embodiments are provided below to describe the present invention, it should be understood that the embodiments are merely provided for description, and are not intended to limit the present invention, and more similar embodiments may exist.

Embodiment 1

Subscriber line information is collected through the following steps.

Configuration information is collected. The configuration information includes template Profile information and bandplan information.

Subscriber line operating information and/or topology information is collected. The subscriber line operating information may include: subscriber line attenuation Hlog information, QLN information, and bit allocation table b table information. The topology information may include: a subscriber line length and distribution of the subscriber lines.

A reference line length is obtained through the following steps.

Subscriber lines are classified into multiple groups, for example G groups, according to the subscriber line length. An average line length of each of the groups is calculated, and the average line length is used as a representative subscriber line length $L_g$. Weighted averaging is performed on the representative subscriber lines according to $N_{total}$ which represents the number of the subscriber lines of a subscriber group, so as to obtain the reference line length L_ref, where a calculation formula is as follows.

$$L\_ref = \sum_{g=1}^{G} \frac{N_g}{N_{total}} L_g$$

UPBO parameters are obtained through the following steps.

A parameter a and a parameter b of each upstream band of each pair of subscriber lines are calculated according to the reference line length, and a frequency point FMAX corresponding to a maximal tone used by each of the subscriber lines is obtained according to the parameter a and the parameter b of each of the upstream bands. Specifically, any one of the following two methods can be adopted to obtain a value of the frequency point FMAX.

In a first method, the calculated parameter a and parameter b are sent to CPE, UPBOMASK is calculated by using the formula proposed in ITU-T Recommendation G993.2, and an UPBO process is executed on the upstream band of the subscriber line. The frequency point FMAX corresponding to the maximal tone used by each of the subscriber lines is obtained directly according to the bit allocation table information reported by the CPE.

In a second method, a frequency point used by each band of each of the subscriber lines is calculated according to the subscriber line attenuation Hlog information and the QLN information in the subscriber line information collected in the previous step, so as to obtain the frequency point FMAX corresponding to the maximal tone of each band of each of the subscriber lines.

After all frequency points FMAX are obtained, a maximal close frequency point UPBOFMAX of each of the subscriber lines is determined according to a pre-determined policy. For example, in an example, a maximal one in a frequency point FMAX collection of subscriber lines other than this subscriber line and having a line segment being longer than this subscriber line may be determined as the maximal close frequency point UPBOFMAX of this subscriber line; or a maximal one in a frequency point FMX collection of other subscriber lines may be directly determined as the maximal close frequency point UPBOFMAX of this subscriber line. For example, an UPBOFMAX parameter of an $n^{th}$ subscriber line can be represented by the following formula:

$$UPBOFMAX(n) = \max_{m \neq n} FMAX(m)$$

The UPBO parameters are delivered through the following steps. Upstream power parameters of each of the upstream bands of each of the subscriber lines are set in a management information table CO-MIB of the central office end equipment CO, which specifically include the parameter a, the parameter b, and the UPBOFMAX, a corresponding UPBO template is configured for each of the subscriber lines, and the corresponding UPBO template is delivered to an UPBO executing device for being executed.

The UPBO is executed through the following steps.

After receiving the template including the UPBO parameters, the CPE is required to calculate the UPBOMASK of each of the bands of the subscriber line, and execute the UPBO process with the maximal close frequency point UPBOFMAX. The formula for calculating the UPBOMASK is as follows:

$$UPBOMASK_{n,US(i)}(f) = \qquad (3)$$
$$\begin{cases} -a(i) - b(i)\sqrt{f} + LOSS(kl_0, f) + 3.5, & f \in US(i) \cap UPBOFMAX(n), i = 1, 2, 3 \\ PSDMASKus_{n,US(i)}(f), & f \in US(i) \cap \overline{UPBOFMAX(n)}, i = 1, 2, 3 \end{cases}$$

In the formula, US(i) represents the upstream band, UPBOFMAX(n) represents the maximal close frequency point of the $n^{th}$ subscriber line on the band, $kl_0$ is a circuit length of the subscriber line; PSDMASK is a standard PSD mask of the band of the subscriber line, and UPBOMASK is a calculated mask for performing the UPBO.

In view of the above, in the subscriber line, when a band f is in an intersection of the upstream band and the maximal close frequency point, the UPBO process is required to be performed on the upstream band below the maximal close frequency point; and the UPBO is not required to be performed on the upstream band over the maximal close frequency point, and the use of a standard PSDMASK is enough.

Embodiment 2

Subscriber line information is collected through the following steps.

Configuration information is collected. The configuration information includes template Profile information and bandplan information.

Subscriber line operating information and/or topology information is collected. The subscriber line operating information may include: subscriber line attenuation Hlog information, QLN information, and bit allocation table b table information. The topology information may include: a subscriber line length and distribution of the subscriber lines.

A reference line length is obtained through the following steps.

An optimal reference line length is searched by traversing from a smallest line length to a greatest line length in sequence with a certain step, and a length may be selected as a current reference line length at first.

A parameter a and a parameter b of each upstream band of each pair of lines are calculated according to the current reference line length, and a frequency point FMAX corresponding to a maximal tone used by each of the subscriber lines is obtained. The process may also be performed by using the two methods introduced in Embodiment 1. Detailed descriptions are provided in Embodiment 1, and are not repeated herein.

A maximal close frequency point UPBOFMAX of each of the subscriber lines is determined according to a pre-determined policy. For example, in an example, a maximal one in a frequency point FMAX collection of subscriber lines other than this subscriber line and having a line segment being longer than this subscriber line may be determined as the maximal close frequency point UPBOFMAX of this subscriber line; or a maximal one in a frequency point FMX collection of other subscriber lines may be directly determined as the maximal close frequency point UPBOFMAX of this subscriber line. For example, an UPBOFMAX parameter of an $n^{th}$ subscriber line can be represented by the following formula, and the UPBOFMAX parameter of the $n^{th}$ subscriber line can be defined as follows.

$$UPBOFMAX(n) = \max_{m \neq n} FMAX(m),$$

A new current reference line length is obtained by adding a step to the current reference line length. The above steps are repeated. When a found current reference line length makes a weighted rate sum of all of the subscriber lines reach a maximal value, the current reference line length is optimal, and is used as the reference line length.

After the UPBOMASK is calculated and when the following conditions are satisfied, the current reference line length may be judged as the optimal one.

$$\max \sum_{n=1}^{N} R_n \quad (4)$$

$$\text{s.t.} \sum_{n=1}^{N} S_n^k \leq P_n, \quad n = 1, 2, \ldots, N.$$

$$0 \leq S_n^k \leq \min(PSDMASK_n^k, UPBOMASK_n^k),$$

$$k = 1, \ldots, K, \quad n = 1, \ldots, N.$$

In the condition, $$R_n = \sum_{k=1}^{K} b_n^k = \sum_{k=1}^{K} \log_2\left(1 + \frac{H_{n,n}^k S_n^k}{\Gamma\left(\sum_{m \neq n} H_{n,m}^k S_m^k + (\sigma_n^k)^2\right)}\right).$$

K represents the number of tones, N represents the number of subscribers, $b_n^k$ represents bit loading of a $n^{th}$ subscriber on a $k^{th}$ tone; $H_{n,n}^k$ represents a transmission loss function of the $n^{th}$ subscriber on the $k^{th}$ tone; $S_n^k$ represents an amplitude value of a signal sent by the $n^{th}$ subscriber on the $k^{th}$ tone; $H_{n,m}^k$ represents a function of FEXT on the $k^{th}$ tone from an $m^{th}$ subscriber to the $n^{th}$ subscriber; $\sigma_n^2$ represents a background noise of the $n^{th}$ subscriber, and $\Gamma$ is a signal-to-noise ratio margin.

The parameter a, the parameter b, and the UPBOFMAX of each of the bands corresponding to the reference line length are obtained.

The UPBO parameters are delivered through the following steps.

Upstream power parameters of each of the upstream bands of each of the subscriber lines are set in a management information table CO-MIB of the central office end equipment CO, which specifically include the parameter a, the parameter b, and the UPBOFMAX, a corresponding UPBO template is configured for each of the subscriber lines, and the corresponding UPBO template is delivered to an UPBO executing device for being executed.

The UPBO is executed through the following steps.

After receiving the template including the UPBO parameters, the CPE is required to calculate the UPBOMASK of each of the bands of the subscriber line, and execute the UPBO process with the maximal close frequency point UPBOFMAX. The specific formula can be obtained in the descriptions of the Embodiment 1. Since the formula is described in detail in Embodiment 1, the description is not repeated herein.

Embodiment 3

Subscriber line information is collected through the following steps.

Configuration information is collected. The configuration information includes template Profile information and bandplan information.

Subscriber line operating information and/or topology information is collected. The subscriber line operating information may include: subscriber line attenuation Hlog information, QLN information, and bit allocation table b table information. The topology information may include: a subscriber line length and distribution of the subscriber line.

A reference line length is obtained through the following steps.

A different reference line length is selected for each band respectively. A minimal value among maximal available frequency points of the band of all of the subscriber lines is found according to bit loading, and the subscriber line length corresponding to the minimal value is selected as the reference line length.

UPBO parameters are obtained through the following steps.

A parameter a and a parameter b of each upstream band of each pair of lines are calculated according to the reference line length of each of the bands, and an available frequency point $FMAX^{us(i)}$ of each of the bands is calculated according to the operating information of each of the subscriber lines, such as the Hlog and QLN. It should be understood that, in other embodiments, the other manner in Embodiment 1 may be adopted to obtain the frequency point FMAX.

After all frequency points FMAX are obtained, a maximal close frequency point UPBOFMAX of each of the subscriber lines is determined according to a pre-determined policy. For example, in an example, a maximal one in a frequency point FMAX collection of subscriber lines other than this subscriber line and having a line segment being longer than this subscriber line may be determined as the maximal close frequency point UPBOFMAX of this subscriber line; or a maximal one in a frequency point FMX collection of other subscriber lines may be directly determined as the maximal close frequency point UPBOFMAX of this subscriber line. For example, an UPBOFMAX parameter of an $n^{th}$ subscriber line can be represented by the following formula:

$$UPBOFMAX(n) = \max_{m \neq n} FMAX(m),$$

The UPBO parameters are delivered through the following steps.

Upstream power parameters of each of the upstream bands of each of the subscriber lines are set in a management information table CO-MIB of the central office end equipment CO, which specifically include parameter a, parameter b, and the UPBOFMAX, a corresponding UPBO template is configured for each of the subscriber lines, and the corresponding UPBO template is delivered to an UPBO executing device for being executed.

The UPBO is executed through the following steps.

After receiving the template including the UPBO parameters, the CPE is required to calculate the UPBOMASK of each of the bands of the subscriber line, and execute the UPBO process with the maximal close frequency point UPBOFMAX. The specific formula can be obtained in the descriptions of the Embodiment 1. Since the formula is described in detail in Embodiment 1, the description is not repeated herein.

Embodiment 4

Subscriber line information is collected through the following steps.

Configuration information is collected. The configuration information includes template Profile information and band-plan information.

Subscriber line operating information and/or topology information is collected. The subscriber line operating information may include: subscriber line attenuation Hlog information, QLN information, and bit allocation table b table information. The topology information may include: a subscriber line length and distribution of the subscriber lines.

A reference line length is obtained through the following steps.

Subscriber lines are classified into multiple groups, for example G groups, according to the subscriber line length. An average line length of each of the groups is calculated, and the average line length is determined as a representative subscriber line length $L_g$. Weighted averaging is performed on the representative subscriber lines according to $N_{total}$ which represents the number of the subscriber lines of a subscriber group to obtain the reference line length L_ref, and a formula is as follows.

$$L\_ref = \sum_{g=1}^{G} \frac{N_g}{N_{total}} L_g$$

UPBO parameters are obtained through the following steps.

A parameter a and a parameter b of each upstream band of each of the representative subscriber lines are calculated according to the reference line length of each of the bands, and a frequency point FMAX corresponding to an available maximal tone of each of the bands of each of the representative subscriber lines is calculated according to the operating information of each of the representative subscriber lines, such as the Hlog and QLN. It should be understood that, in other embodiments, the other manner in Embodiment 1 may be adopted to obtain the frequency point FMAX.

After all frequency points FMAX are obtained, a maximal close frequency point UPBOFMAX of each of the subscriber lines is determined according to a pre-determined policy. For example, in an example, a maximal one in a frequency point FMAX collection of subscriber lines other than this subscriber line and having a line segment being longer than this subscriber line may be determined as the maximal close frequency point UPBOFMAX of this subscriber line; or a maximal one in a frequency point FMX collection of other subscriber lines may be directly determined as the maximal close frequency point UPBOFMAX of this subscriber line. For example, an UPBOFMAX parameter of an $n^{th}$ subscriber line can be represented by the following formula:

$$UPBOFMAX(n) = \max_{m \neq n} FMAX(m),$$

The UPBO parameters are delivered through the following steps.

Upstream power parameters of each of the upstream bands of each of the subscriber lines are set in a management information table (CO-MIB) of the central office end equipment CO, which specifically include the parameter a, the parameter b, and the UPBOFMAX, a corresponding UPBO template is configured for each of the subscriber lines, and the corresponding UPBO template is delivered to an UPBO executing device executing. It should be noted that, in this embodiment, for the subscriber lines of the same group, only the template including the UPBO parameters of the representative subscriber line of the group is required to be configured.

The UPBO is executed through the following steps.

After receiving the template including the UPBO parameters, the CPE is required to calculate the UPBOMASK of each of the bands of the subscriber line, and execute the UPBO process with the maximal close frequency point UPBOFMAX. In this embodiment, an UPBO process is executed on the band of each of the subscriber lines in the same group lower than the maximal close frequency point according to the parameter a, parameter b, and the UPBOFAX of the representative subscriber line of the group. The specific formula can be obtained in the descriptions of the Embodiment 1. Since the formula is described in detail in Embodiment 1, the description is not repeated herein.

In the four embodiments, the UPBO method in the DSL according to the present invention is described. It should be understood that in other embodiments of the present invention, an UPBOFMAX enabling function may also be added, so that a system can be switched between a common UPBO mode and an UPBO mode according to the embodiments of the present invention. For example, when the maximal close frequency point is set as a constant value, for example 30 M, the UPBO method according to the embodiments of the present invention degenerates into a common UPBO method, thereby being fully compatible with the existing standards.

Figure 5:
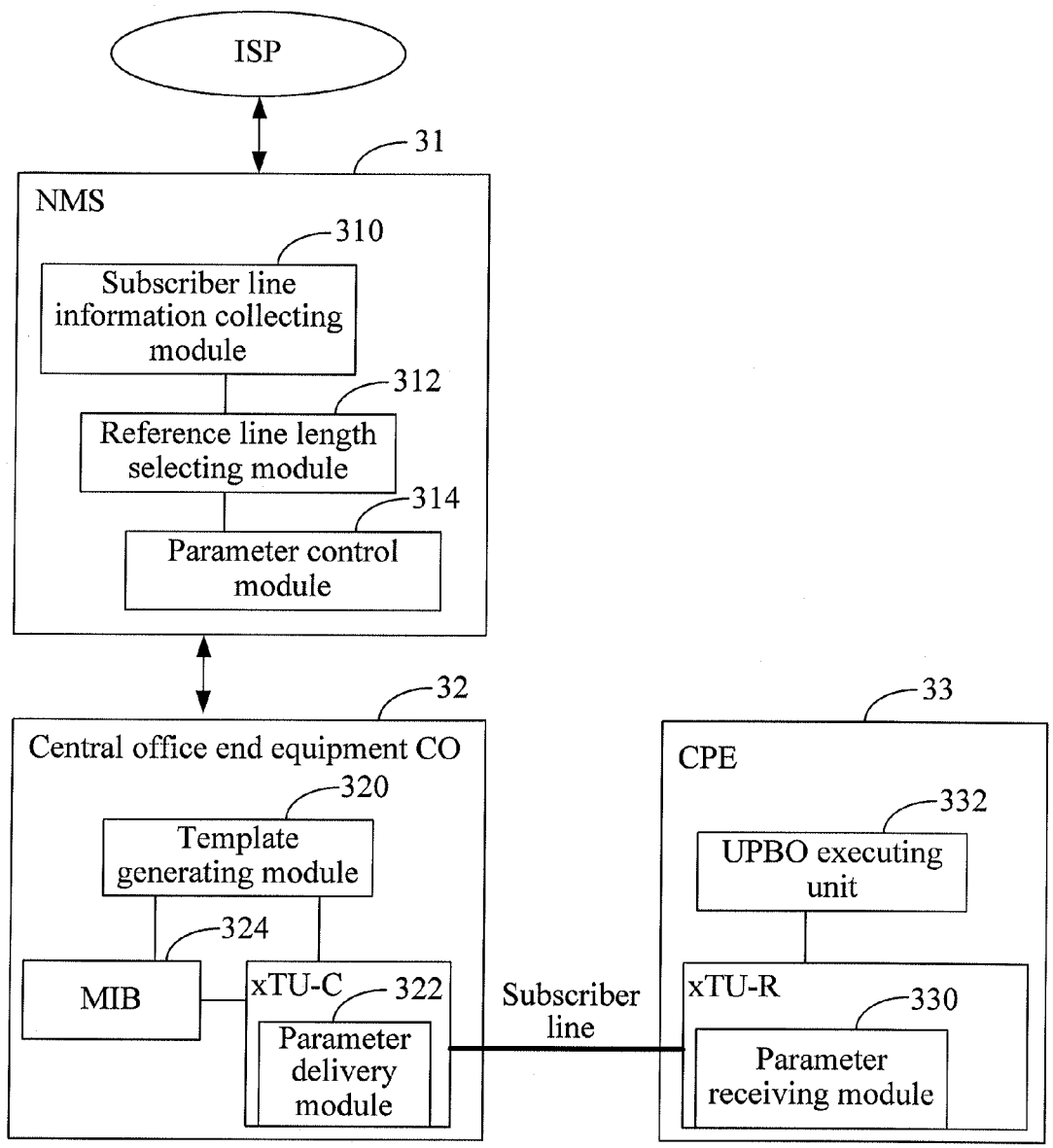
FIG. 5 is a schematic view of an UPBO system in a DSL according to an embodiment of the present invention.

FIG. 5 is a schematic view of a device for obtaining UPBO parameters in a DSL according to an embodiment of the present invention. The system includes a subscriber line information collecting module 310, a reference line length selecting module 312, and a parameter control module 314.

The subscriber line information collecting module 310 is configured to collect subscriber line information. The subscriber line information includes configuration information and at least one of subscriber line operating information and topology information. The subscriber line operating information includes subscriber line attenuation Hlog information. The topology information includes a subscriber line length. The configuration information includes template Profile information and bandplan information.

The reference line length selecting module 312 is configured to determine a reference line length according to the subscriber line information collected by the subscriber line information collecting module 310.

The reference line length selecting module 312 is further configured to determine a length as the reference line length based on a pre-determined policy according to the subscriber line information.

The parameter control module 314 is configured to obtain UPBO parameters of each upstream band of each subscriber line according to the determined reference line information. The UPBO parameters include a parameter a, a parameter b, and a maximal close frequency point UPBOFMAX. The parameter control module 314 may be further configured to calculate the parameter a and the parameter b of each of the upstream bands of each pair of subscriber lines according to the reference line length, obtain a frequency point FMAX corresponding to a maximal tone used by each of the subscriber lines according to the parameter a and the parameter b of each of the upstream bands, and use one from a frequency point FMAX collection as the maximal close frequency point UPBOFMAX of an upstream band of this subscriber line.

The subscriber line information collecting module 310, the reference line length determining module 312, and the parameter control module 314 may be disposed in an NMS 31. It should be understood that, the subscriber line information collecting module 310, the reference line length determining module 312, and the parameter control module 314 may also be disposed in other devices, for example, being presented in the form of a server.

The device further includes a Management Information Base (MIB) 324, a template generating module 320, and a parameter delivery module 322.

The MIB 324 is configured to store the UPBO parameters.

The template generating module 320 is configured to generate a template, including the UPBO parameters of each of the upstream bands, for each group of or each of the subscriber lines according to the UPBO parameters obtained by the parameter control module 314.

The parameter delivery module 322 is configured to send the template including the UPBO parameters of each of the upstream bands to a device executing an UPBO process.

The MIB 324, the template generating module 320, and the parameter delivery module 322 may be disposed in central office end equipment CO 32. Furthermore, the function of the parameter delivery module 322 may be achieved in an XDSL Transmission Unit-Central (xTU-C).

The system further includes a parameter receiving module 330 and an UPBO executing unit 332.

The parameter receiving module 330 is configured to receive the template including the UPBO parameters. The UPBO parameters include the parameter a, parameter b, and the maximal close frequency point UPBOFMAX of each of the upstream band of each of the subscriber lines.

The UPBO executing unit 332 is configured to execute the UPBO process on the corresponding band of the subscriber line below the maximal close frequency point according to the UPBO parameters received by the parameter receiving module.

The parameter receiving module 330 and the UPBO executing unit 332 may be disposed in CPE 33. Furthermore, the function of the parameter receiving module 330 may be achieved in an xDSL Transmission Unit-Remote (xTU-R). It should be understood that, more details of each of the functional modules of the DSL UPBO system of the present invention can be obtained in the descriptions in the embodiments of the DSL UPBO method of the present invention, and are not described here in detail.

In the embodiments of the present invention, the UPBOFMAX parameter is introduced to the UPBO parameters, while the stability of the subscriber lines is ensured, the UPBOFMAX parameter configured to execute the UPBO on the short lines is controlled to prevent a bandwidth from being too large when an UPBO process is performed on the short lines. High frequency parts of the short lines are used for bearing more bits, thereby maximally increasing an upstream rate of the short lines, so as to maximize an UPBO gain, and increase potential demands of an operator on the upstream high rate.

Additionally, in the embodiments of the present invention, an optimal reference line length can be obtained automatically, and the existing UPBO mode is fully compatible, as long as the UPBOFMAX parameter is set as a constant value, such as 30 M.

In the embodiments of the present invention, while the stability of the subscriber lines is ensured, the maximal UPBOFMAX configured to execute the UPBO on the short lines is controlled.

Through the above description of the implementation, it is clear to persons skilled in the art that the present invention may be accomplished through software plus a necessary hardware platform, or only through hardware. Based on this, the technical solution of the present invention or the part making contributions to the prior art can be substantially embodied in the form of a software product. The computer software product may be stored in a storage medium such as a ROM/RAM, a magnetic disk, or an optical disk, and contain several instructions to instruct computer equipment (for example, a personal computer, a server, or network equipment) to perform the method described in the embodiments of the present invention or in some parts of the embodiments.

Some exemplary embodiments of the present invention are described. It should be noted by persons of ordinary skill in the art that modifications and variations may be made without departing from the principle of the present invention, which should be construed as falling within the scope of the present invention.

What is claimed is:

1. A method for Upstream Power Back-Off (UPBO) in a Digital Subscriber Line (DSL), wherein the method comprises:

collecting subscriber line information, wherein the subscriber line information comprises configuration information, and at least one of subscriber line operating information and topology information, the subscriber line operating information comprises subscriber line attenuation Hlog information, the topology information comprises a subscriber line length, and the configuration information comprises template Profile information and bandplan information;

determining a reference line length according to the subscriber line information; and obtaining UPBO parameters of each upstream band of each subscriber line according to the reference line length, so that Customer Premise Equipment (CPE) executes an UPBO process on the corresponding upstream band of the subscriber line below a maximal close frequency point according to the UPBO parameters comprising an original point parameter, a back-off slope parameter, and the maximal close frequency point UPBOFMAX.

2. The method according to claim 1, wherein the determining the reference line length according to the subscriber line information comprises:
   selecting a length from a shortest line to a longest line in sequence with a certain step as a current reference line length;
   calculating the original point parameter and the back-off slope parameter of each of the upstream bands of each pair of the subscriber lines according to the current reference line length;
   obtaining a frequency point FMAX corresponding to a maximal tone used by each of the subscriber lines according to the original point parameter and the back-off slope parameter of each of the upstream bands of each pair of the subscriber lines;
   using a maximal one in a frequency point FMAX collection of subscriber lines other than the subscriber line and having a line segment being longer than the subscriber line as the maximal close frequency point UPBOFMAX of the subscriber line; and
   repeating the above steps, until the current reference line length makes a weighted rate sum of all of the subscriber lines reach a maximal value, and using the current reference line length making the weighted rate sum of all of the subscriber lines reach the maximal value as the reference line length.

3. The method according to claim 2, wherein the obtaining the UPBO parameters of each of the upstream bands of each of the subscriber lines according to the reference line length comprises:
   using the original point parameter, the back-off slope parameter, and the maximal close frequency point UPBOFAX corresponding to the reference line length making the weighted rate sum of all of the subscriber lines reach the maximal value as the UPBO parameters of each of the upstream bands of the subscriber line.

4. The method according to claim 1, wherein the determining the reference line length according to the subscriber line information comprises:
   dividing the subscriber lines into at least two groups according to the subscriber line length; and
   using an average line length of each of the groups as a representative subscriber line length, and performing weighted averaging on representative subscriber lines according to the number of the subscriber lines of a subscriber group of each of the representative subscriber lines to obtain the reference line length.

5. The method according to claim 4, wherein the obtaining the UPBO parameters of each of the upstream bands of each of the subscriber lines according to the reference line length comprises:
   calculating the original point parameter and the back-off slope parameter of each of the upstream bands of each pair of the subscriber lines according to the reference line length;
   obtaining a frequency point FMAX corresponding to a maximal tone used by each of the subscriber lines according to the original point parameter and the back-off slope parameter of each of the upstream bands; and
   using a maximal one in a frequency point FMAX collection of subscriber lines other than the subscriber line and having a line segment being longer than the subscriber line as the maximal close frequency point UPBOFMAX of the subscriber line.

6. The method according to claim 3, wherein the obtaining the frequency point FMAX corresponding to the maximal tone used by each of the subscriber lines according to the original point parameter and the back-off slope parameter of each of the upstream bands comprises:
   obtaining the frequency point FMAX corresponding to the maximal tone used by each of the subscriber lines directly according to bit allocation table information reported after the UPBO is executed according to the original point parameter and the back-off slope parameter; or
   calculating the frequency point used on each of the bands of each of the subscriber lines according to the collected subscriber line information Hlog and QLN, and obtaining the frequency point FMAX corresponding to the maximal tone used by each of the subscriber lines.

7. The method according to claim 4, wherein the obtaining the UPBO parameters of each of the upstream bands of each of the subscriber lines according to the reference line length comprises:
   calculating the original point parameter and the back-off slope parameter of each of the upstream bands of each of the representative subscriber lines according to the reference line length;
   calculating a frequency point FMAX corresponding to an available maximal tone of each of the upstream bands of each of the representative subscriber lines according to the subscriber line information of each of the representative subscriber lines; and
   using a maximal one in a frequency point FMAX collection of subscriber lines other than the representative subscriber line and having a line segment being longer than the representative subscriber line as the maximal close frequency point UPBOFMAX of the representative subscriber line.

8. The method according to claim 7, wherein the executing the UPBO process on the corresponding upstream band of the subscriber line below the maximal close frequency point according to the UPBO parameters comprises:
   executing the UPBO process on the band of each of the subscriber lines in the same group lower than the maximal close frequency point according to the original point parameter, the back-off slope parameter, and the UPBOFAX of the representative subscriber line of the group.

9. The method according to claim 1, wherein the determining the reference line length according to the subscriber line information comprises:
   respectively selecting a different reference line length for each of the bands;
   finding a minimal value among maximal available frequency points of the corresponding upstream bands of all of the subscriber lines according to bit loading; and
   using the length of the subscriber line corresponding to the minimal value as the reference line length.

10. The method according to claim 9, wherein the obtaining the UPBO parameters of each of the upstream bands of each of the subscriber lines according to the reference line length comprises:
   calculating the original point parameter and the back-off slope parameter of each of the upstream bands of each pair of the subscriber lines according to the reference line length of each of the bands;
   obtaining an available frequency point FMAX of each of the band according to the operating information of each pair of the subscriber lines; and
   using a maximal value among the available frequency points of subscriber lines other than the subscriber line and longer than the subscriber line as the maximal close frequency point of the band of the subscriber line.

11. A device for obtaining Upstream Power Back-Off (UPBO) parameters, comprising:

a subscriber line information collecting module, configured to collect subscriber line information, wherein the subscriber line information comprises configuration information, and at least one of subscriber line operating information and topology information, the subscriber line operating information comprises subscriber line attenuation Hlog information, the topology information comprises a subscriber line length, and the configuration information comprises template Profile information and bandplan information;

a reference line length selecting module, configured to determine a reference line length according to the subscriber line information collected by the subscriber line information collecting module; and a parameter control module, configured to obtain UPBO parameters of each upstream band of each subscriber line according to the reference line length, wherein the UPBO parameters comprises an original point parameter, a back-off slope parameter, and a maximal close frequency point UPBOFMAX.

12. The device according to claim 11, further comprising:

a template generating module, configured to generate a template comprising the UPBO parameters of each of the upstream bands, for each group of or each of the subscriber lines according to the UPBO parameters obtained by the parameter control module; and a parameter delivery module, configured to send the template comprising the UPBO parameters of each of the upstream bands to a device executing an UPBO process.

13. An Upstream Power Back-Off (UPBO) system in a Digital Subscriber Line (DSL), comprising central office end equipment and Customer Premise Equipment (CPE), wherein the central office end equipment is configured to: collect subscriber line information, determine a reference line length according to the subscriber line information collected by a subscriber line information collecting module, and obtain UPBO parameters of each upstream band of each subscriber line according to the reference line length, wherein the subscriber line information comprises configuration information, and at least one of subscriber line operating information and topology information, the subscriber line operating information comprises subscriber line attenuation Hlog information, the topology information comprises a subscriber line length, and the configuration information comprises template Profile information and bandplan information; and the UPBO parameters comprise an original point parameter, a back-off slope parameter, and a maximal close frequency point UPBOFMAX; and the CPE is configured to receive the UPBO parameters, wherein the UPBO parameters comprise the original point parameter, the back-off slope parameter, and the maximal close frequency point UPBOFMAX of each of the upstream bands of each of the subscriber lines; and execute an UPBO process on the corresponding band of the subscriber line below the maximal close frequency point according to the UPBO parameters received by a parameter receiving module.

14. The system according to claim 13, wherein the central office end equipment is further configured to:

generate a template comprising the UPBO parameters of each of the upstream bands, for each group of or each of the subscriber lines according to the UPBO parameters obtained by the parameter control module, and send the template comprising the UPBO parameters of each of the upstream bands to the CPE.

15. The system according to claim 13, wherein the CPE is further configured to: receive the template comprising the UPBO parameters, wherein the UPBO parameters comprise the original point parameter, the back-off slope parameter, and the maximal close frequency point UPBOFMAX of each of the upstream bands of each of the subscriber lines.

* * * * *